March 15, 1938.  E. BUCHMANN ET AL  2,111,386
ELECTRICAL CIRCUIT CONTROL DEVICE
Filed Feb. 24, 1936

INVENTORS
EWALD BUCHMANN
ERNST HOBBIE
BY
ATTORNEY

Patented Mar. 15, 1938

2,111,386

UNITED STATES PATENT OFFICE 2,111,386

ELECTRICAL CIRCUIT CONTROL DEVICE

Ewald Buchmann and Ernst Hobbie, Berlin, Germany, assignors to Siemens & Halske Aktiengesellschaft, Siemenstadt, near Berlin, Germany, a corporation of Germany Application February 24, 1936, Serial No. 65,446
In Germany March 6, 1935

5 Claims. (Cl. 250—27)

Figure 1:
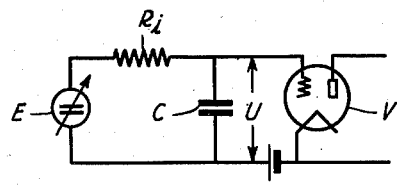

In electric circuits consisting of a direct current source with internal resistance, of a parallel condenser and of the input circuit of a vacuum tube, the building-up and dying-out period is essentially determined by the internal resistance of the current source and by the capacity of the condenser if the direct voltage source is controlled. Such a circuit is shown in Figure 1. The input circuit of the amplifier tube V contains the variable direct voltage E placed in series to the resistance $Ri$ which is usually the internal resistance of source E, said variable direct voltage may have alternating current components superposed thereon. The parallel capacity is designated by C. The building-up period of the circuit is determined by the charging period of the condenser and the dying-out period by the time of discharge of the condenser. Since the charging and discharge current of the condenser pass across the same resistance $Ri$, the two time periods are approximately equal.

Hence there exists between the building-up period $ta$ and the dying-out period $tn$ a relationship determined by the resistance values of the circuit, and which in this circuit cannot be influenced at will.

However, for many purposes, it is desirable to provide the possibility of independently affecting the two values, for instance, to obtain a desired dying-out period $tn$ without varying the building-up period $ta$ and the voltage U. Such requirements are often desired for echo blocking means which are to have a short period of response and a long after effect.

Figure 2:
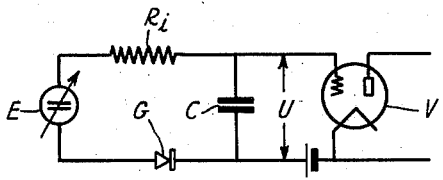
Figure 3:
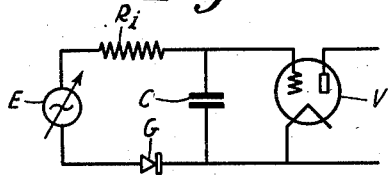
Figure 4:
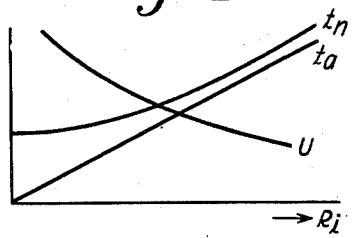
Figure 5:
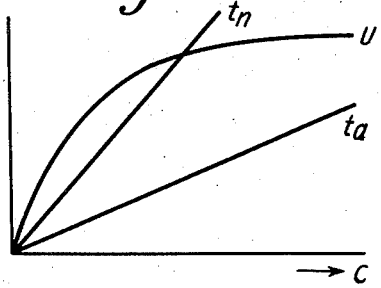
Figure 6:
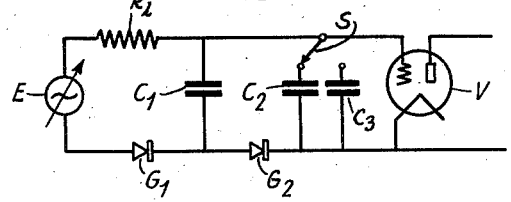
Figure 7:
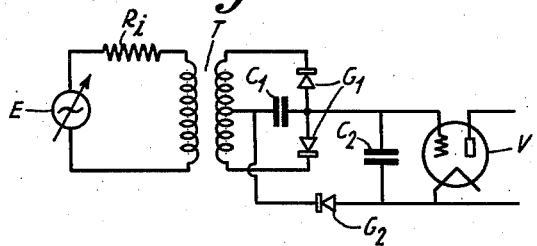
Figure 8:
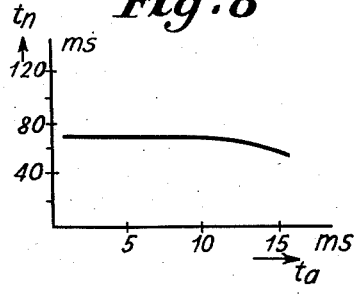

For a better understanding of the invention reference is made to the accompanying drawing, in which:

Figure 1 shows a circuit arrangement for charging a condenser in the input circuit of an electron discharge tube, Fig. 2 is a similar circuit with the addition of a rectifier according to our invention, Fig. 3 is an embodiment of our invention as applied to a vacuum tube amplifier, Figs. 4 and 5 show certain operating characteristics of the circuit arrangement of Fig. 3, Figs. 6, 7 and 9 show circuits embodying the invention in which two rectifiers are utilized and, Fig. 8 shows the relationship between the charging and discharging periods of the circuit shown in Fig. 7.

According to our invention, an independent control of building-up and dying-out period is obtained by inserting in the circuit a resistance whose value or action depends upon direction. This results in the principal circuit shown in Fig. 2. Between the source E and one side of the condenser C there is inserted a resistor whose value depends on the current direction and constitutes a rectifier G. The charging period of the condenser is dependent upon the value of resistor $Ri$ and upon the pass resistance $Rd$ of the rectifier G, i. e. upon $Ri+Rd$. For the time of discharge however, besides the inner resistor $Ri$ there is to be considered the blocking resistance $Rs$ of the rectifier. Hence the time of discharge depends upon $Ri+Rs$. If $Rs$ is high as compared with $Ri$, or if $Rs$ and $Ri$ are chosen of the same order, the charging period remains substantially the same when connecting the rectifier, since $Rs$ is generally much higher than $Rd$, while the time of discharge will be considerably increased. Thus it is seen that by inserting a resistance whose value is dependent upon direction, a certain independence between $ta$ and $tn$ can be obtained. If the rectifier is inserted in the circuit in an opposite direction, the charging period can be substantially increased while the time of discharge remains approximately constant. In the circuit shown, no additional voltage drop of appreciable value occurs, through the introduction of the resistance dependent upon direction, since there does not exist an appreciable load due to the input circuit of the tube. The resistor dependent upon direction may be a tube or a dry detector.

The application of the idea of the invention affords particular advantages in case of detector circuits such as shown for instance in Fig. 3. Herein, the A. C. source E is placed in series to the inner resistor, the detector G and appertaining parallel condenser C all arranged in the input circuit of amplifier tube V. The size of condenser C is determined by the prescribed direct potential and by the requirement as regards absence of A. C. components. Likewise, the inner resistor $Ri$ is determined by the properties of the A. C. source, so that the building-up and dying-out period of the detector circuit is substantially determined. It is not possible through variation of $Ri$ or of C either to vary only the building-up period or only the dying-out period, but there exists, as shown in Figs. 4 and 5, a relationship of the three values as to the inner resistor $Ri$ and size of the condenser C. Excepting the cases in which a very high value for $Ri$ is chosen, the time of discharge is substantially greater than the charging time $ta$ as shown by curves $tn$ and $ta$ respectively. A reverse relationship between the two periods is not obtainable with known circuits.

In this case, by utilizing the idea of the invention, the proportion between $tn$ and $ta$ can be influenced at will within wide limits, and it is even possible to obtain a charging time that is greater than the time of discharge.

Two examples for applying the idea of the invention to detector circuits are shown in Figs. 6 and 7. Fig. 6 represents a detector circuit according to Fig. 3, supplemented by the rectifier G2 and by the condenser C2 in accordance with the invention. If the condenser C2 is smaller than the condenser C1, the charging time will not be essentially affected by this condenser C2. This charging period is then mainly determined by the condenser C1 and by the resistor Ri. However, the condenser C2 increases the dying-out period to an essential degree, since its charge will but slowly be discharged across the series connection formed by the blocking resistance of rectifier G2, the blocking resistance of rectifier G1 and the inner resistance Ri.

This circuit also presents the possibility of switching the dying-out period for instance, in the proportion 1:5 from 300 to 1500 milli-seconds, without an appreciable variation in the building-up period. This can be accomplished by providing condensers C2 and C3 having two values to be utilized by corresponding switching. By switching-in the smaller condenser which is small as compared with the condenser C1, the time constants of the circuit G2, C2 are ineffective as compared with the time constants of the rectifier circuit. If the larger condenser is connected, as in the position of switch S shown, the entire building-up period does not change appreciably, but the entire dying-out period can be increased to a high value, for instance, to a five times greater value.

Fig. 7 shows the application of the invention to a two-way rectifier circuit. The A. C. source E, together with the inner resistor Ri is connected to the two detectors G1 across transformer T. The detected voltage is derived from the condenser C1 connected between the common point of the two detectors and a center tap of the secondary of the transformer. The rectifier G2 is so inserted in this example that it increases the building-up period without essentially influencing the dying-out period. The curve according to Fig. 8, shows the values measured in a circuit according to Fig. 7. The dying-out period $tn$ of 70 milliseconds is substantially constant, whereas the building-up period varies between a very small value up to 15 milliseconds.

Besides applying the invention to the mentioned blocking circuits, it is obvious that it can be utilized in all cases in which the time constants of a circuit especially back of the detector, are to be influenced at will. In this connection there are to be considered in the first place, all control circuits for maintaining constant amplitudes and levels, for compensation of fading or for volume control.

Figure 9:
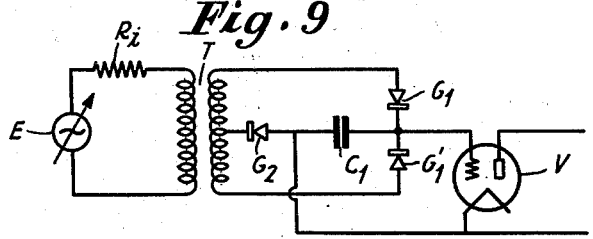

The condenser C2 utilized in the circuit of Fig. 7 can be omitted, if, as indicated in Fig. 9, the rectifier G2 is placed between the center tap of the secondary of transformer T and the condenser C1. For each alternation the charging current of the condenser C1 flows in the same direction, namely either across rectifier G1 or across rectifier G1'. In case of the polarity of rectifier G2 as shown, the charging current will be affected to a negligible extent while the discharge current will be considerably influenced by the high blocking resistance of rectifier G2. The circuit according to Fig. 9 is otherwise the same as that according to Fig. 7.

Having described our invention what we claim as new and desire to secure by Letters Patent is:

1. In combination, a vacuum tube having a pair of input electrodes, a condenser having its opposite sides connected to said respective electrodes, a source of variable voltage, a resistor connected between one terminal of said source and one side of said condenser, two rectifiers connected in series between the other terminal of said source and the other side of said condenser and a second condenser having one side connected to the common terminal of said rectifiers and its other side connected to the end of said resistor remote from said voltage source.

2. The combination defined in the preceding claim in which the capacity values of said condensers are unequal.

3. In combination in a device of the class described, a transformer, a series circuit connecting the ends of the secondary of said transformer and including two rectifiers, a condenser having one side connected to the common terminal of said rectifiers and its other terminal to an intermediate point of said secondary winding and a circuit connected to the opposite sides of said condenser and including the series connection of a rectifier and a capacitor.

4. The combination defined in the preceding claim in which the blocking resistance of said last named rectifier is so chosen as to increase considerably the charging period of said condenser.

5. In a device of the class described the combination of an electron discharge tube having a pair of input terminals, an input transformer, two rectifiers connected in series between spaced apart points of a winding of said transformer, a condenser and a rectifier connected in series between the common terminal of said rectifiers and an intermediate point of said transformer winding and direct current connections between the opposite sides of said condenser and said respective input terminals.

EWALD BUCHMANN.
ERNST HOBBIE.